United States Patent [19]
Perkins et al.

[11] Patent Number: 5,660,341
[45] Date of Patent: Aug. 26, 1997

[54] ROTARY GRATER

[75] Inventors: Nancy Perkins; Karen Wolters, both of Chicago, Ill.

[73] Assignee: The Pampered Chef, Ltd., Addison, Ill.

[21] Appl. No.: 601,666

[22] Filed: Feb. 15, 1996

[51] Int. Cl.[6] .............................. A47J 43/25; A47J 43/28
[52] U.S. Cl. ........................... 241/93; 99/510; 99/567;
241/92; 241/169.1; 241/273.2
[58] Field of Search .......................... 99/495, 510–513;
241/92, 68, 93, 82.7, 167, 82.5, 169.1,
222, 273.1–273.3, 278.1, 280, 101.2; D7/678,
372

[56] References Cited

U.S. PATENT DOCUMENTS

| | | |
|---|---|---|
| D. 147,566 | 9/1947 | Repp et al. . |
| D. 147,688 | 10/1947 | Schechtel . |
| D. 156,557 | 12/1949 | Piker . |
| D. 169,034 | 3/1953 | Frank . |
| D. 183,185 | 7/1958 | Silberberg . |
| 197,383 | 11/1877 | Livingstone . |
| D. 235,501 | 6/1975 | Mantelet . |
| D. 235,502 | 6/1975 | Mantelet . |
| D. 260,129 | 8/1981 | Shun . |
| D. 276,202 | 11/1984 | Shun . |
| 1,114,411 | 10/1914 | Stuver . |
| 1,411,634 | 4/1922 | Lambdin . |
| 2,271,175 | 1/1942 | Mantelet . |
| 2,487,597 | 11/1949 | Sampson . |
| 2,502,867 | 4/1950 | Mantelet . |
| 2,529,473 | 11/1950 | Rustici . |
| 3,907,215 | 9/1975 | Mantelet . |
| 4,081,145 | 3/1978 | Moe et al. . |
| 4,214,714 | 7/1980 | Graham . |
| 4,214,715 | 7/1980 | Graham . |
| 4,219,165 | 8/1980 | Bergan et al. . |
| 4,227,656 | 10/1980 | Engebretsen . |
| 4,884,755 | 12/1989 | Hedrington . |
| 5,148,995 | 9/1992 | Hurst . |

Primary Examiner—Timothy F. Simone
Attorney, Agent, or Firm—Olson & Hierl, Ltd.

[57] ABSTRACT

An improved hand-held, hand-crank operated rotary drum-type grater for cheese and the like is provided. The grater is adapted to incorporate molded plastic or metal components but preferably utilizes a cage-type drum body having a cylindrical surface defined by a metal sheet having bladed perforations. The drum is insertable into either end of a cylindrical cavity defined transversely in the grater hopper and thereafter is engagable with a crank. The drum has an internally threaded hub at one end that is engagable with a threaded stub shaft of the crank. The hopper has an improved integral support handle and also is associated with an improved press plate with an integral support arm. The arm pivotably extends adjacently to the handle, both the handle and the arm are graspable by one hand. The grater has few components, and the food contacting components thereof can be readily dissembled so that the entire grater is easily cleaned after use.

9 Claims, 2 Drawing Sheets

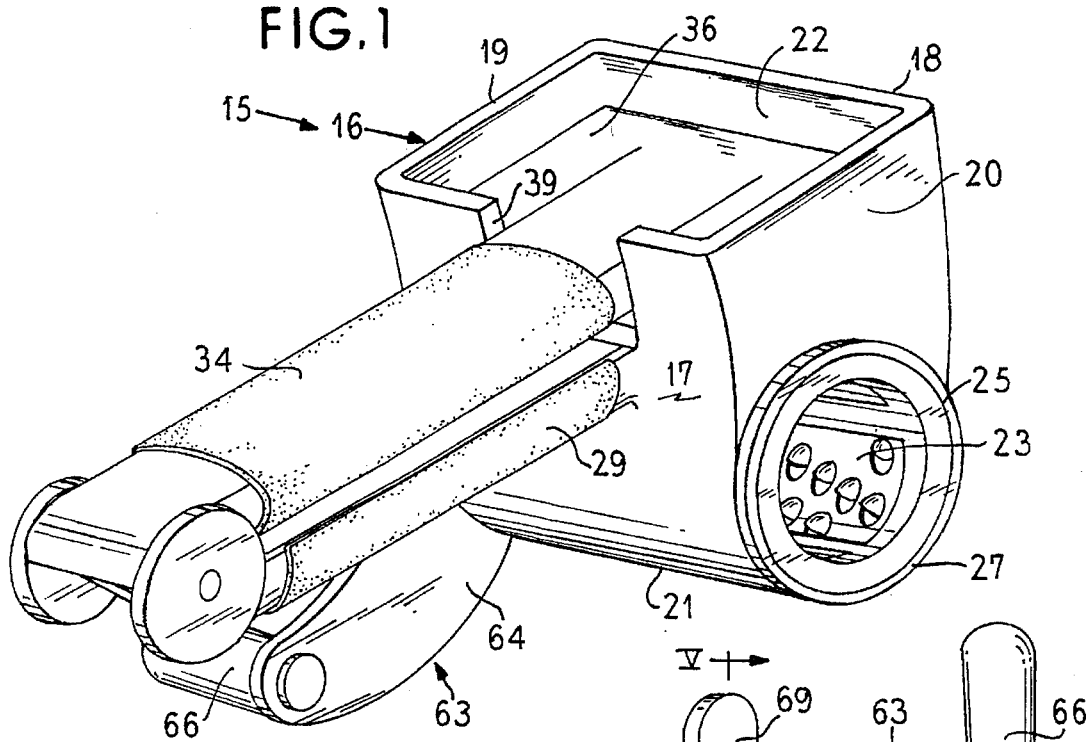
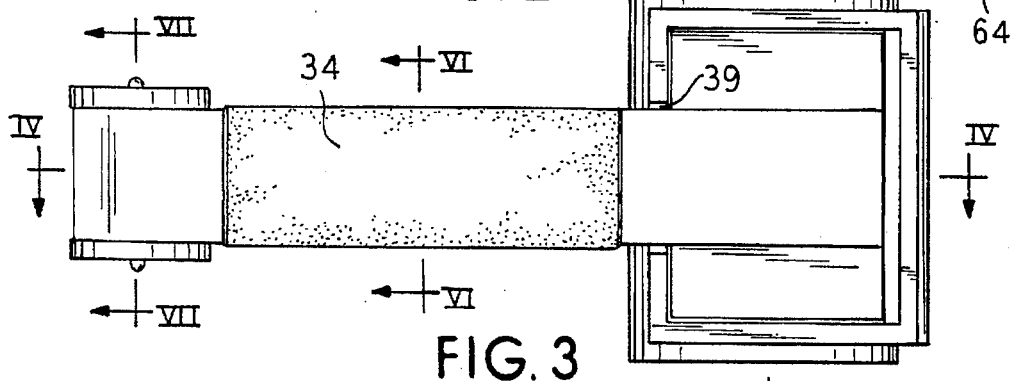
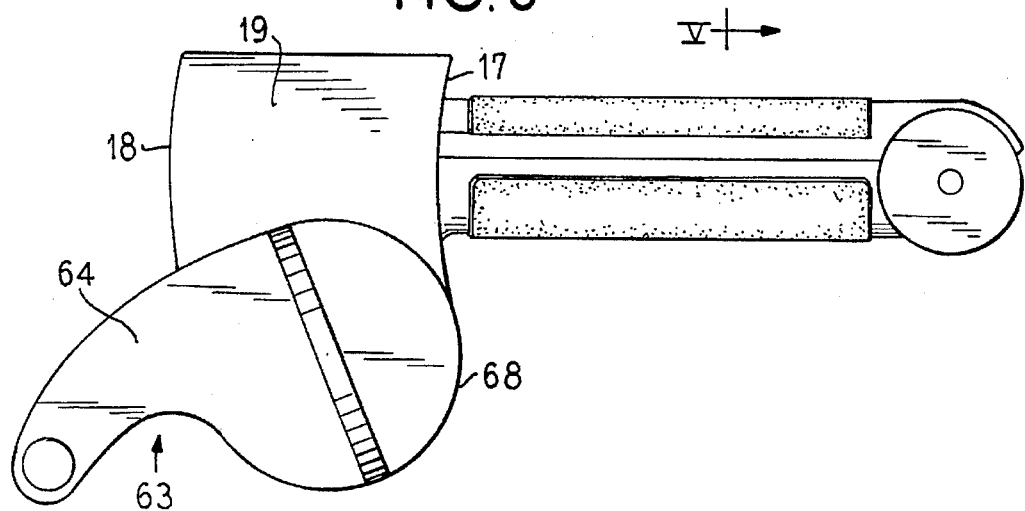

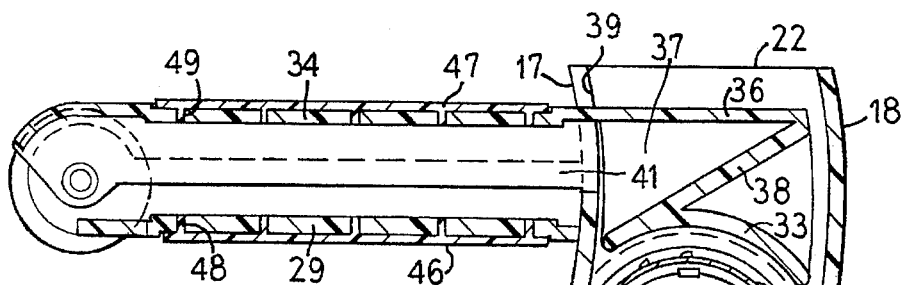
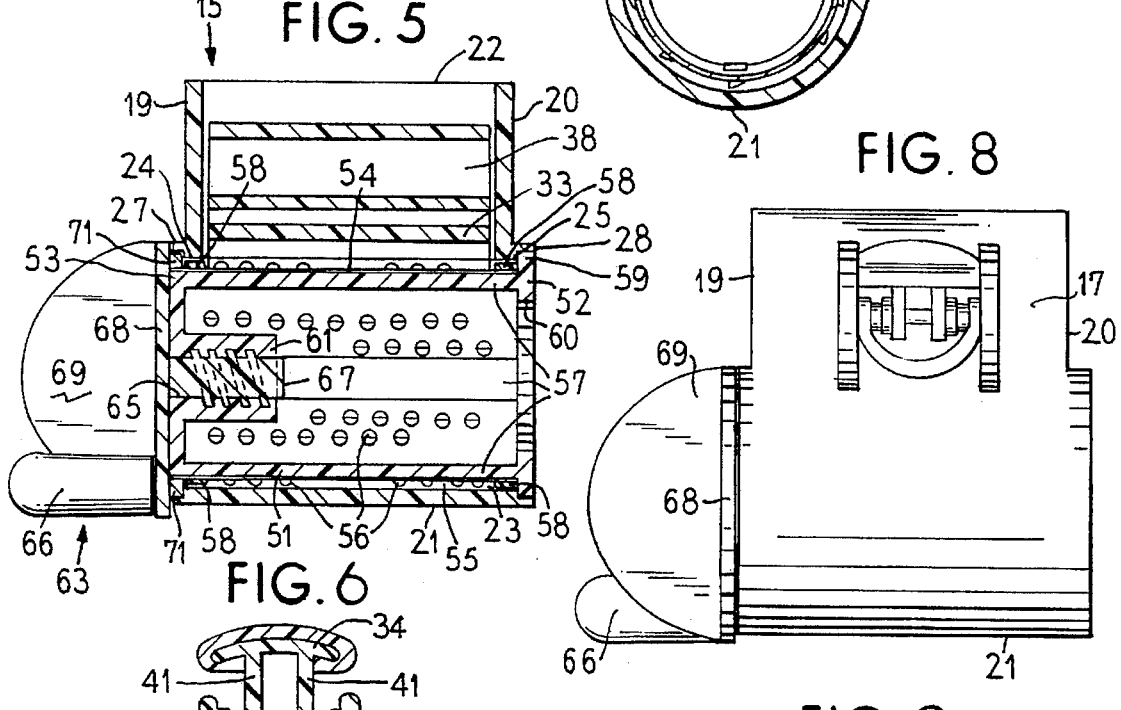
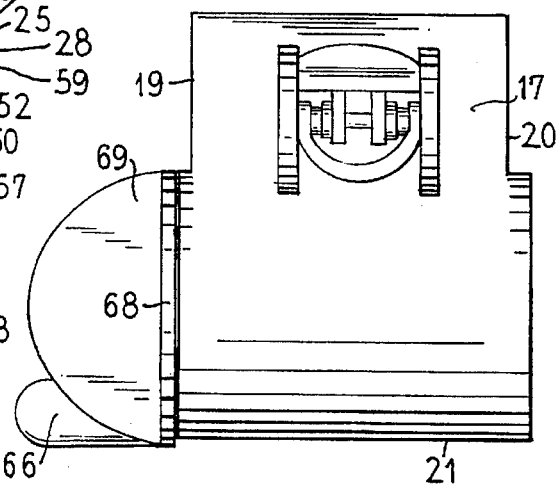
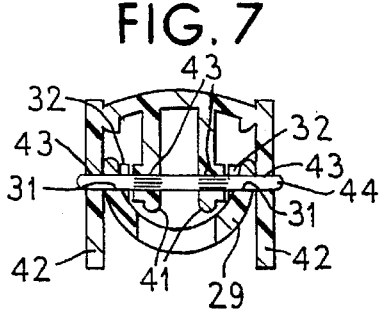
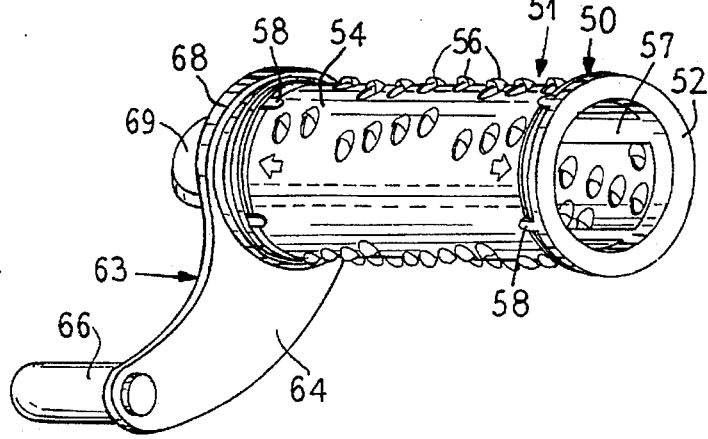

1

ROTARY GRATER

FIELD OF THE INVENTION

This invention relates to rotary drum-type graters for cheese and similar food products.

BACKGROUND OF THE INVENTION

Various hand-held, hand-crank operated, rotary drum-type graters for cheese and the like that incorporate molded plastic or metal components have been previously developed. See, for example, Mantelet U.S. Design Pat. No. 235,501 or Shun U.S. Design Pat. No. 276,202. Such graters, however, include various disadvantages.

For example, the upper portion of the hopper can be pivotably inclined relative to the lower portion of the hopper by means of a medial hinge. The hinge extends transversely across the side of the hopper opposite the side associated with the support handle. As a result, food can become lodged between the adjacent upper and lower portions of the hopper.

Moreover, that type of grater is not easily washed or sanitized after use. The rotary drum and hand crank assembly often can not be readily disassembled. Also, it is often awkward to open and to maintain the hinged hopper in an open configuration during washing. Food particles and microorganisms can become lodged in inaccessible or difficult to access locations and thus are difficult to remove through hand or mechanical washing.

In addition, such a grater is made so that during use, the hand crank is located only on one side of the hopper, usually the right side. Thus, the grater is most convenient for use by right-handed people, the crank being turned by the right hand while the support handle of the hopper, along with the press support arm, if present, are held and clamped together by the left hand.

There is a need for an improved grater structure wherein such disadvantages are overcome.

SUMMARY OF THE INVENTION

This invention relates to an improved hand-held, hand-crank operated, drum-type grater for cheese and similar food products.

The grater is adapted to incorporate molded plastic or metal components but preferably includes a drum having a cylindrical surface defined by a metal sheet that has a desired pattern of edged projections defined therein. The grater employs relatively few component parts. The components that contact food during a grating operation can be readily disassembled after use. The grater is thus easily and thoroughly cleanable.

The grater is assembled so that the hand crank is located either on the right or left side of the hopper housing. Thus, the crank can be turned by either the right hand or the left hand based on the preference of the user.

The hopper housing is characterized by a unitary construction, thereby improving grater strength, ease in food processing and cleanability. The hopper is provided with an integrally formed, laterally and outwardly projecting improved handle means, and an improved combination of arm means and press plate means. The handle means and the arm means are held and operated by one hand of the user. A lower portion of the hopper is provided with a transversely extending, cylindrical cavity that receives the drum.

The drum can be variously comprised but preferably includes a cage-type cylinder that is preferably overlaid circumferentially with a metal sheet (preferably stainless steel) that has edged projections. The drum has a proximal end and a distal end. The proximal end of the drum is insertable into the hopper cylindrical cavity from either side. The distal end of the drum is provided with a radially outwardly projecting rim flange that limits axial movement yet permits drum rotation in the cylindrical cavity. The proximal end of the drum is provided with a threaded, axially oriented receiving hub.

The crank can be variously comprised but preferably incorporates an arm having at one end a boss and a threaded crankshaft that is threadably engagable with the drum hub. The boss also includes a longitudinally projecting rim flange which when the crank is assembled with the drum, limits axial movement of the drum yet permits drum rotation in the cylindrical cavity. Preferably, the boss further includes an exterior upstanding wing for gripping during assembly and disassembly.

Thus, the proximal end of the drum is insertable into either end of hopper cylindrical cavity and is extended therein so as to be positioned adjacent the opposite cavity end. The crankshaft is then threadably engaged with the proximal end of the drum and the grater is ready for use.

Other and further objects, aims, features, purposes, advantages, embodiments, applications and the like will be apparent to those skilled in the art from the present specification taken with the accompanying drawings and the appended claims.

BRIEF DESCRIPTION OF THE DRAWINGS

In the drawings:

FIG. 1 is a perspective view of one embodiment of a rotary drum type grater of the present invention;

FIG. 2 is a top plan view of the embodiment of FIG. 1;

FIG. 3 is a side elevational view of the embodiment of FIG. 1;

FIG. 4 is a vertical sectional view taken longitudinally and medially along the line IV—IV of FIG. 2;

FIG. 5 is a transverse vertical sectional view taken along the line V—V of FIG. 2, the crank shaft being shown unsectioned for clarity purposes;

FIG. 6 is a transverse vertical sectional view taken along the line VI—VI of FIG. 2;

FIG. 7 is a transverse vertical sectional view taken along the line VII—VII of FIG. 2;

FIG. 8 is a rear end elevational view of the embodiment of FIG. 1 and,

FIG. 9 is a perspective subassembly view of the threadably but reversibly engaged combination of grating drum and hand crank employed in, but shown apart from, the embodiment of FIG. 1.

DETAILED DESCRIPTION

Referring to the drawings, one embodiment 15 of a grater of this invention which is suitable for grating a food stuff such a cheese or the like is shown. Grater 15 incorporates a hopper 16 having opposed lateral sides 17 and 18 and opposed transverse sides 19 and 20. The top 22 of hopper 16 is open and the (gravitationally) lower and bottom portions of lateral sides 17 and 18 curve towards one another, and meet and join integrally and indistinctly to form a generally continuous, cylindrically curved hopper bottom region 21. A transversely extending interiorly upwardly open cylindrical channel 23 is defined in the lower end of hopper 16. Channel 23 has circular opposed end apertures 24 and 25, one aperture being defined in each transverse side 19 and 20, respectively. The apertures 24 and 25 and the cylindrical channel 23 are generally coaxial relative to the cylindrical curvature of the bottom region 21.

In the region of each aperture 24 and 25, the respective hopper sides 19 and 20 are each provided with a transversely outwardly projecting and circumferentially formed flange 27 and 28, respectively. The inside diameters of each of the flanges 27 and 28 are equal and this diameter is slightly larger than the internal (upwardly incomplete or open) cylindrical diameter of channel 23 and of apertures 24 and 25. The inside respective longitudinal (relative to channel 23) faces of the flanges 27 and 28 extend parallel to the axis of channel 23 and the radially extending exposed shoulder region of each flange 27 and 28 is preferably substantially flat.

The adjacent lateral side 17 (relative to transverse sides 19 and 20) of hopper 16 is provided with an integral, elongated support handle 29. Supporting and reinforcing triangularly configured (in side elevation) ribs (not shown) can be provided, if desired, between adjacent exterior portions of handle 29 and side 17. The handle 29 has, in transverse cross section (see FIGS. 6 and 7), a general C-configuration so that the exterior lower surfaces thereof are generally rounded. The upper outer terminal region of handle 29 is provided with a pair of transversely aligned holes 31 (one hole being in each end edge portion of the C-shape, see FIG. 7). Preferably, and as shown, a portion of the end edge of the C-shape is interiorly transversely thickened and strengthened by integral stub projections 32, each projection 32 having a flattened interior face that is in spaced, parallel relationship relative to the other.

The grater 15 is provided with a combination of a hopper press plate 33 and an integrally associated elongated arm 34 which extends laterally outwardly from a forward face of press plate 33 is located at the margin of the (extended) curvature of the channel 23 (see FIG. 4). In this position, the ribs 41 are in contacting relationship relative to the bottom edge of the notch 39 and thereby limit the downward movement of press plate 33.

The opposite rear opposing outside portions of the arm 34 are each provided with an integrally formed mounting and guidance plate 42 (paired). Each plate 42 is in spaced, parallel relationship relative to the other. For exemplary purposes, each plate 42 is shown with a circular perimeter, but those skilled in the art will appreciate that various perimeter configurations can be used. In the region of the plates 42, the ribs 41 are downwardly distended. A set of transversely aligned apertures 43 is provided in each of the plates 42 and ribs 41. These apertures 43 are adapted for alignment with the holes 31. As so aligned, a pivot pin 44 is extended through holes 31 and apertures 43, thereby permitting arm 34 to pivot upwardly and downwardly relative to handle 29. The limit of upward pivotal movement is reached when the terminus of arm 34 abuts against the outer end of handle 29 (see FIG. 4). Typically, pin 44 is not separated from arm 34 and handle 29 during cleaning or storage of grater 15. Various alternative pivotal connecting arrangements can be employed for arm 34 and handle 29.

Preferably and as shown, the exposed concave facial or surface portions of each of arm 34 and handle 29 is provided with a layer of cushioning material 47 and 46, respectively, that extends over these curved surface portions. The combination of hopper 16 and handle 29, and the combination of press plate 33 and arm 34, as described above, are each conveniently and preferably formed of a molded plastic of a character adapted for such a structural application as here contemplated in side region of press plate 33. Press plate 33 slidably moves up or down in hopper 16. The lower or food-contacting outside surface of press plate 33 has a radius of curvature which preferably matches the radius of curvature of the channel 23. In vertically upwardly spaced relationship to press plate 33, an integrally joined flattened support and connecting rectangular plate 36 is provided. At each opposite transverse side of plate 36, and in the mid-region of plate 36 integrally formed walls 37 generally vertically integrally extend between plate 36 and plate 33. Also, a diagonally extending integral brace 38 (see FIG. 4) is provided that extends from the front lateral side of plate 36 to the rear lateral side of plate 33.

The elongated upper surface portions of arm 34 are generally convexly upwardly curved. This arm 34 surface curvature conveniently and illustratively commences in a mid-region of the upper face of plate 36. For reasons of convenience, compactness and leverage, the arm 34 here extends, like handle 29, in a straight configuration. In order for the arm 34 to avoid interference with the side 17 of hopper 16, and in order to permit the height of the arm 34-associated press plate 33 to be changed as a grating operation proceeds in the assembled, operative grater 15, a notch 39 is medially defined in the upper portion of side 17 to accommodate therewithin entrance into, and vertical movement of, arm 34. The interior or bottom surface portions of arm 34 are provided with a pair of longitudinally medially extending, equally spaced ribs 41 that commence adjacent to plate 36 and extend rearwardly to the terminus or end of arm 34.

The relative spatial orientations of handle 29 and of arm 34 are preferably (and as shown) such that arm 34 extends in spaced, adjacent, parallel overlying relationship relative to handle 29 when the open or grater 15. As those skilled in the art will readily appreciate, such a plastic can be, for example, an ABS resin, an acrylate resin, a polyester resin, a nylon resin, or the like, as desired. The handle 29 and the arm 34 can each be preliminarily molded so as to have a curved surface configuration that is adapted for a subsequent molding thereover in a second independent molding operation of the desired cushioning layers 46 and 47. Illustratively, each of handle 29 and arm 34 is preferably initially molded with a plurality of surface apertures 48 and 49, respectively.

The apertures 48 and 49 become filled with the material of the cushioning layer during the subsequent molding; such a filled aperture arrangement provides anchoring sites for the cushioning material. The material of the cushioning layer, as those skilled in the art will readily appreciate, can be comprised of any one of various plastics, for example, a vinyl plastisol, a formed-in-place foamed polyurethane elastomer, a olefinic elastomer or the like, as desired. Various handle, arm and press plate structures and configurations can be utilized in a grater of this invention. Preferably, all the plastics used in a grater of this invention are insensitive to grease and oil and stable under the conditions reached in automatic dishwashers. The amount of manually applied force exerted between the arm 34 and the handle 29 determines the pressure applied to a foodstuff that is located between press plate 33 and drum 51 and is undergoing grating.

The grating drum 51 employed in a grater of this invention can be variously structured. The grater 15 preferably employs a cage-type cylindrical drum 51 having a body 50 and cylindrical side wall portions 54. The portions 54 are comprised of a preformed, generally continuously extending, sheet metal, preferably stainless steel. In such a sheet metal, a desired pattern of apertured grating protrusions (or perforations) 56 (see FIG. 9) are formed such that each protrusion 56 has a raised edged region adapted for the cutting or scraping of food stuffs positioned relative thereto during one circumferential direction of movement of side wall portions 54, and wherein preferably all protrusions 56 are similar in grating effect. The fabrication of such a perforated sheet metal structure is known to the prior art. Protrusion 56 selection can vary according to the grating desired.

The body 50 of drum 51 is preferably of unitary molded construction and can be conveniently comprised of a plastic that can be selected from among those indicated above as being suitable for use in the combination comprising hopper 16 and handle 29 or the like as desired. At each of its opposite ends, the drum 51 body 50 is provided with a generally frame member, preferably a ring-like frame member 52 at the distal end of the drum 51 and a disk-like frame member 53 at the proximal end of the drum 51. Frame member 52 has a central opening 60. Frame members 52 and 53 are in spaced, parallel coaxial relationship to each other.

The diameter of frame member 53 is about equal to or slightly less than the diameter of the side wall portions 54. The radial spacing 55 in the assembled drum 51 between the outside surface of the cylindrical side wall portions 54 and the radially adjacent inside cylindrical surface portions of the channel 23 is preferably chosen to be at least equal to the maximum radial height of the protrusions 56 and may be somewhat greater, if desired, as those skilled in the art will readily appreciate. A series of circumferentially equally spaced integrally formed stringers 57 is provided (illustratively four) that extend unitarily and longitudinally between respective circumferential regions of the frame members 52 and 53. Taken together, the stringers 57 define an open, cage-type cylindrical configuration. The radially outside surfaces of each of the stringers 57 is preferably slightly curved so as to equal the radius of curvature of the cylinder and of the respective frame members 52 and 53. When the perforated sheet metal (with the desired protrusions 56 therein) is laid circumferentially around and over the stringers 57, the cylindrical side wall portions 54 are achieved. To hold the perforated sheet metal in the desired circumferential position, each frame member 52 and 53 is provided with a plurality of circumferentially spaced, interiorly opening holding tabs 58 (illustratively four) that are preferably located in radially adjacent relationship to each stringer 57. The radial thickness of each tab 58 is preferably such that the circumferential outside surface thereof is radially slightly less than the adjacent diameter of channel 23 while the inside surface thereof has a portion that is sufficiently radially spaced from an adjacent stringer 57 to accommodate the thickness of the sheet metal. Edge portions of the sheet metal adjacent to each tab 58 are tucked or slid thereunder and are held thereby.

The diameters of the frame member 53 and of the side wall portions 54 are such that they are each slidably receivable in and through each respective aperture 24 and 25, and are axially slidable through the channel 23.

The frame member 52 is provided with a circumferentially extending, radially outwardly projecting rim flange 59 which is adapted to be nestably received diametrically within either one of the circumferential flanges 27 and 28 when the proximal end of drum 51 and frame member 53 has been inserted into and moved through the channel 23 from one of apertures 24 or 25 to the opposite one thereof.

The body 50 is also provided at its proximal end with an axially located and axially extending cylindrical hub 61 which is unitarily formed with frame member 53. Hub 61 has a central channel 65 whose circumferentially extending inside wall portions are threaded.

The grater 15 further includes a crank 63 which includes an arm 64 that in the assembled grater 15 generally radially outwardly extends from the proximal end frame member 53 of the drum 51. Arm 64 at its outer end terminates in a laterally (or longitudinally relative to drum 51) outwardly extending crank pin 66 that is adapted for grasping between the thumb and finger of either the left or right hand of a user. If desired, pin 66 can be journaled for rotation relative to arm 64. Arm 64 at its inner end terminates in a laterally extending integrally formed crank shaft 67 that is here exteriorly circumferentially threaded. The arm 64 in the vicinity of crank shaft 67 is provided with a radially (relative to drum 51) enlarged boss 68.

Relative to the assembled grater 15, the outside face of boss 68 is provided preferably and as shown with an integral, upstanding, axially (relative to crank shaft 67) outwardly projecting wing 69 that adapted for grasping between the thumb and forefinger of one hand of a user. Wing 69 is useful during the assembly and disassembly of crank 63 relative to drum 51 and from the grater 15.

When the drum is positioned operatively in the channel 23, the crank shaft 67 is threadably engagable with the hub 61. The threads associated with each of the crank shaft 67 and the hub 61 are preferably clockwise oriented when the drum 51 is adapted to grate when rotated in a clockwise direction during a grating operation by turning the crank pin 66.

The boss 68 is further provided on its inside surface in radially spaced relationship to crank shaft 67 with a circumferentially extending, longitudinally inwardly projecting boss flange 71 whose length and thickness are adapted for slidably fitting into the space existing between either flange 27 or 28 and the outside circumferential edge portion of the frame member 53 in the assembled grater 15. The boss flange 71 cooperates with the boss 68 and the rim flange 59 to allow rotation of the drum 51 and to maintain the spacing 55 in the assembled grater 15. The boss 68 and the flanges 59 and 71 also cooperate to limit axial travel of the drum 51 in the assembled grater 15.

Thus, the grater 15 can be assembled so that the crank 63 is located adjacent either transverse side 19 or 20 of hopper 16. Preferably, the lateral sides are curved so as to correspond to the arcuate travel path of press plate 33 relative to pin 44.

During a grating operation, grated food particles pass through the apertures associated with each protrusion 56 in the cylindrical side wall portions 54, enter the central cavity of the drum 51 and leave the grater 15 through the central opening 60 of ring frame member 52.

Other and further arrangements, variations, embodiments, applications and the like for the present invention will be apparent from the foregoing disclosure and teachings and no undue limitations are to be implied or inferred therefrom.

What is claimed:

1. A grater for food products comprising in combination:
   a handle-equipped hopper for receiving gratable food, said hopper having a transversely extending cylindrical channel defined therethrough, said channel having opposed ends;
   a hopper press plate and integral arm means, said arm means and said handle together being hand graspable;

a drum having a cylindrical side wall that is perforated for grating and having a proximal end and an opposed distal end, said distal end having rim flange means, said proximal end having a threaded axial hub means, said proximal end being insertable into said channel from each said opposed ends; and a crank having a crank arm with opposite ends, a crank pin means at one said end, and a circumferentially threaded crank shaft means at the opposite said end said crank having rim flange means located about said crank arm adjacent said crank shaft; whereby said crank shaft means is threadably engagable with said hub means, and, when so engaged, said crank pin means is hand turnable, thereby to revolve said drum in said channel.

2. The grater of claim 1 wherein said drum comprises (a) a unitarily formed cage-type body with a plurality of circumferentially spaced, longitudinally extending stringers positioned between a pair of end plates, one of which defines said proximal end and the other of which defines said distal end, said stringers and said end plates defining a cylindrical configuration, and (b) a metal sheet having apertured grating protrusions formed therein, said sheet being mounted around portions of said circumferential configuration and including means for so mounting said sheet.

3. The grater of claim 1 wherein said crank arm includes an integrally formed upstanding wing located on the outside surface thereof opposite said crank shaft.

4. A grater for food products and the like comprising in combination:

(A) a hopper having:
(1) opposing side and end walls;
(2) an open top and a transversely cylindrically configured bottom;
(3) a transversely extending upwardly open cylindrical channel defined transversely therethrough and located adjacent to said bottom, said channel including at each opposite end a flanged aperture defined in each opposing side wall;
(4) an elongated handle for supporting said hopper, said handle being integral with one end wall and laterally outwardly extending from said one end wall; and
(5) a notch defined in said one end wall above said handle;
(6) a hopper press plate with an integral, laterally outwardly extending support arm that is extendable through, and is vertically movable in, said notch,
(7) said handle and said arm extending in adjacent relationship and the outer end of said arm being pivotably connected to the outer end of said handle;

(B) a drum having a cage-type unitarily formed cylindrical body and a sheet circumferentially located about said body member,
(1) said body comprising a circularly configured proximal end frame, a toroidally configured distal end frame generally coaxial with and longitudinally spaced from said proximal end frame, and a plurality of circumferentially spaced, longitudinally extending stringers integrally interconnecting circumferential portions of each of said proximal frame and said distal frame whereby said body defines a cylindrical configuration,
(2) said sheet having a plurality of apertured grating protrusions formed therein and said sheet being wrapped around said stringers and including mounting means for said sheet,
(3) said body further including hub means integrally interconnected to said proximal end frame, said hub means including an axial channel which is internally threaded,
said distal end frame including first rim means that is nestably receivable in each of said flanged apertures,
said proximal end being insertable into said channel through each one of said apertures; and (C) a crank having a crank arm with opposite ends, a crank pin means at one said end, and a circumferentially externally threaded crank shaft means at the opposite said end,
(1) said crank arm including a boss at said opposite end, said boss including second rim means that is nestably receivable in each of said flanged apertures,
(2) said crank shaft means being threadably engagable with said axial channel;
whereby said drum is locatable in said channel through each one of said flanged apertures, and is, when so located, threadably engagable with said hub means, hereby said crank is locatable adjacent to either one of said flanged apertures, and said first and said second rim means cooperate with each one of apertures, whereby said drum is adapted for rotational movements when said crank pin is manually revolved, and whereby during, said rotational movements, gratable food in said hopper is grated and grated food particles enter said drum and discharge through said distal end frame.

5. The grater of claim 4 wherein said hopper side and end walls cooperate to provide an arcuate configuration whose radius of curvature corresponds with the radius of curvature of the pivot path followed by said press plate when said arm is pivotably moved relative to said handle.

6. The grater of claim 4 wherein portions of said arm and said handle are manually graspable by one hand and said portions are provided with a cushioning layer.

7. The grater of claim 4 wherein said crank shaft is circumferentially threaded externally and said hub is matingly circumferentially threaded internally.

8. The grater of claim 4 wherein said boss includes an integrally formed upstanding thumb and finger graspable wing located on the outside surface thereof and extending diametrically across the axis of said crank shaft, said wing being adapted for manually rotating said crank shaft relative to said drum.

9. The grater of claim 4 wherein said crank shaft threads and said hub threads extend spirally clockwise, said drum is rotatable clockwise by said crank and when so rotated is adapted to grate.

* * * * *

UNITED STATES PATENT AND TRADEMARK OFFICE
CERTIFICATE OF CORRECTION

PATENT NO. : 5,660,341            Page 1 of 2
DATED : August 26, 1997
INVENTOR(S) : Nancy Perkins and Karen Wolters It is certified that error appears in the above-indentified patent and that said Letters Patent is hereby corrected as shown below:

Column 3, line 36, delete from "forward face of" to Column 4, line 3, to "contemplated in" and insert-- in column 4, line 36, after "open or"--

--side region of press plate 33. Press plate 33 slidably moves up or down in hopper 16. The lower or food-contacting outside surface of press plate 33 has a radius of curvature which preferably matches the radius of curvature of the channel 23. In vertically upwardly spaced relationship to press plate 33, an integrally joined flattened support and connecting rectangular plate 36 is provided. At each opposite transverse side of plate 36, and in the mid-region of plate 36 integrally formed walls 37 generally vertically integrally extend between plate 36 and plate 33. Also, a diagonally extending integral brace 38 (see Figure 4) is provided that extends from the front lateral side of plate 36 to the rear lateral side of plate 33.

UNITED STATES PATENT AND TRADEMARK OFFICE
CERTIFICATE OF CORRECTION

PATENT NO.   : 5,660,341
DATED        : August 26, 1997
INVENTOR(S)  : Nancy Perkins and Karen Wolters It is certified that error appears in the above-identified patent and that said Letters Patent is hereby corrected as shown below:

The elongated upper surface portions of arm 34 are generally convexly upwardly curved. This arm 34 surface curvature conveniently and illustratively commences in a mid-region of the upper face of plate 36. For reasons of convenience, compactness and leverage, the arm 34 here extends, like handle 29, in a straight configuration.
In order for the arm 34 to avoid interference with the side 17 of hopper 16, and in order to permit the height of the arm 34-associated press plate 33 to be changed as a grating operation proceeds in the assembled, operative grater 15, a notch 39 is medially defined in the upper portion of side 17 to accommodate therewithin entrance into, and vertical movement of, arm 34. The interior or bottom surface portions of arm 34 are provided with a pair of longitudinally medially extending, equally spaced ribs 41 that commence adjacent to plate 36 and extend rearwardly to the terminus or end of arm 34.
The relative spatial orientations of handle 29 and of arm 34 are preferably (and as shown) such that arm 34 extends in spaced, adjacent, parallel overlying relationship relative to handle 29 when the open or—

Signed and Sealed this

Second Day of June, 1998

Attest:

BRUCE LEHMAN

*Attesting Officer*  *Commissioner of Patents and Trademarks*